United States Patent
Boone et al.

(10) Patent No.: US 9,302,455 B1
(45) Date of Patent: Apr. 5, 2016

(54) FAST CURE PROCESS

(71) Applicant: Cessna Aircraft Company, Wichita, KS (US)

(72) Inventors: Richard Boone, Wichita, KS (US); Engin Sabuncu, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 234 days.

(21) Appl. No.: 13/835,051

(22) Filed: Mar. 15, 2013

Related U.S. Application Data

(63) Continuation-in-part of application No. 13/763,416, filed on Feb. 8, 2013.

(60) Provisional application No. 61/596,651, filed on Feb. 8, 2012.

(51) Int. Cl.
  *B29C 65/00* (2006.01)
  *B32B 37/00* (2006.01)
  *B32B 37/02* (2006.01)

(52) U.S. Cl.
  CPC ..................... *B32B 37/02* (2013.01)

(58) Field of Classification Search
  CPC .......... B29C 66/7375–66/73756; B29C 65/18; B32B 37/06; B32B 38/0036
  USPC ............ 156/228, 307.1, 307.7, 311; 264/345, 264/347
  See application file for complete search history.

(56) References Cited

U.S. PATENT DOCUMENTS

| | | |
|---|---|---|
| 4,770,929 A | 9/1988 | Nobumasa et al. |
| 4,833,029 A | 5/1989 | DuPont et al. |
| 5,123,985 A | 6/1992 | Evans et al. |
| 5,242,523 A | 9/1993 | Willden et al. |
| 5,368,807 A | 11/1994 | Lindsay |
| 5,562,796 A | 10/1996 | Ertl |
| 5,604,010 A | 2/1997 | Hartz et al. |
| 5,707,576 A | 1/1998 | Asher |
| 5,954,898 A * | 9/1999 | McKague et al. .............. 156/64 |
| 6,128,998 A | 10/2000 | Freitas et al. |
| 6,458,309 B1 | 10/2002 | Allen et al. |
| 6,589,472 B1 | 7/2003 | Benson et al. |
| 6,632,502 B1 | 10/2003 | Allen et al. |
| 2002/0006523 A1 | 1/2002 | Obeshaw |
| 2002/0071920 A1 | 6/2002 | Obeshaw |
| 2003/0082385 A1 | 5/2003 | Li et al. |
| 2003/0168555 A1 | 9/2003 | Livi et al. |
| 2003/0198775 A1 | 10/2003 | Roth et al. |
| 2004/0115299 A1 | 6/2004 | Potter et al. |
| 2004/0175555 A1 | 9/2004 | Ogisu |

(Continued)

OTHER PUBLICATIONS

Daniel, Isaac M. Ishai, Ori. Engineering Mechanics of Composite Materials (2nd Edition). © 2006 Oxford University Press.*

(Continued)

*Primary Examiner* — Carson Gross
(74) *Attorney, Agent, or Firm* — Lathrop & Gage LLP

(57) ABSTRACT

A method for fast curing a component made from composite laminate. The method rapidly raising the temperature of the component by applying heat at an accelerated temperature for a ramp time, holding the temperature of the component at a set temperature for a set dwell time, and removing heat from the component to slow curing process. The method may additionally include inspecting the component after removing the component from heat, and curing the component a final time to equivalent or better strength.

10 Claims, 2 Drawing Sheets

(56) References Cited

U.S. PATENT DOCUMENTS

| | | |
|---|---|---|
| 2005/0183808 A1 | 8/2005 | Barguet et al. |
| 2005/0183818 A1 | 8/2005 | Zenker et al. |
| 2006/0006599 A1 | 1/2006 | Shahidi et al. |
| 2006/0049552 A1 | 3/2006 | Fish |
| 2006/0254710 A1 | 11/2006 | Jung et al. |
| 2008/0083494 A1 | 4/2008 | Sander et al. |
| 2008/0265093 A1 | 10/2008 | Lopez et al. |
| 2009/0020645 A1 | 1/2009 | Cacciaguerra |
| 2009/0074905 A1 | 3/2009 | Matsen et al. |
| 2009/0261199 A1 | 10/2009 | McCarville et al. |
| 2009/0263618 A1 | 10/2009 | McCarville et al. |
| 2009/0283638 A1 | 11/2009 | Rodriguez et al. |
| 2009/0320398 A1 | 12/2009 | Gouvea |
| 2010/0098910 A1 | 4/2010 | Naritomi et al. |
| 2010/0159189 A1 | 6/2010 | Takagi et al. |
| 2011/0045232 A1 | 2/2011 | Kismarton |
| 2011/0097554 A1 | 4/2011 | Kehrl et al. |

OTHER PUBLICATIONS

Office Action in related U.S. Appl. No. 12/829,234 dated Jan. 3, 2011, 10 pages.

Response to Office Action in related U.S. Appl. No. 12/829,234 dated Mar. 18, 2011, 10 pages.

Office Action in related U.S. Appl. No. 12/829,234 dated Mar. 21, 2011, 13 pages.

Office Action in related U.S. Appl. No. 12/779,709 dated Aug. 1, 2011, 18 pages.

Notice of Allowance issued in related U.S. Appl. No. 12/779,706 dated Jan. 26, 2012, 9 pages.

Notice of Allowance issued in related U.S. Appl. No. 12/829,234 dated Jan. 19, 2013, 15 pages.

U.S. Appl. No. 13/763,416 Office Action dated Oct. 22, 2014, 9 pages.

* cited by examiner

FAST CURE PROCESS

RELATED APPLICATIONS

This application is a Continuation-in-Part of, and claims benefit of priority to, U.S. patent application Ser. No. 13/763,416, filed Feb. 8, 2013, which claims priority to U.S. Provisional Application Ser. No. 61/596,651, filed Feb. 8, 2012. All of the aforementioned applications are incorporated herein by reference.

FIELD OF THE INVENTION

The invention relates generally to the field of composite structure manufacturing.

BACKGROUND OF THE INVENTION

Typical composite lay-up can take many forms. These include hand placement, automated ply placement, automated tow placement, resin infusion (RTM, VRTM, SQURTM, etc). The process typically involves individual plies on distinct layers applied in exacting orientations. Once applied, the entire laminate is the covered in a vacuum bag and then cured in an oven or autoclave.

Composite materials pre-impregnated with resin (pre-preg materials) are typically processed through cure cycles that take longer than 60 minutes at a given cure temperature, such as a minimum of 120 minutes at a cure temperature. The cure cycle is the time required to allow the composite material to completely harden into its final form. Previous methods of curing composite laminates use pressure and a rate of heating to a curing temperature of about 1-8 degrees F./per minute because faster heating rate will cause inconsistent heating, thereby impairing the properties of the component. Further, individual components are typically fully cured first and then bonded together, a process which is time consuming and costly.

SUMMARY

The present disclosure is for methods for fast curing composite structures. Fast curing allows the composite structure to reach a state where it is strong enough to maintain its stiffness and physical shape under temperature and pressure, but still has not fully cured to its final strength and thus can still be bonded to another composite structure before both structures are bonded together using a full curing process. Thus, time is saved because instead of taking the time necessary to fully cure both parts of a composite structure and then bond the two composite structures together, one composite structure may be fast cured and then placed into its position with respect to a second composite structure, and then both parts may be fully cured and bonded together. Therefore, two complete cure cycles are not necessary.

In an embodiment of the present disclosure, methods for optimizing the fast cure cycle are presented and achieved via thermal analysis using a "Dynamic Mechanical Analyzer". For example, methods of the present disclosure use a Dynamic Mechanical Analyzer in a fast cure method whereby the process temperature is simulated while acquiring glass transition temperature and storage modulus data for the material during different stages of curing a composite structure.

After a composite structural component has been manufactured using the fast cure processes of the present disclosure, a physical and mechanical properties equivalency test matrix is performed on the composite structure after a final cure to ensure material properties have recovered to the expected level of strength.

In one embodiment, a method for fast curing a component made from composite laminate includes assembling the component within a bond tool. The temperature of the component is rapidly raised by applying heat at an accelerated temperature for a ramp time. The temperature of the component is held at a set temperature for a dwell time in order to raise the glass transition temperature of the component; and heat is removed from the component to slow the curing process.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for a fast cure process useful in the manufacturing of composite structures.

Using embodiments of the present disclosure, prepregs achieve ~80-90% of their cure and service temperature capability within the first 20-30 minutes at a cure temperature, and a prepreg processed for 30 minutes has almost similar handling characteristics, stiffness and capability compared to a fully cured material.

Fast Cure Process

In one aspect, the fast cure process disclosed herein uses pressure and a rapid rate of heating to a curing temperature of about 15-20 degrees F/per minute.

Figure 1:
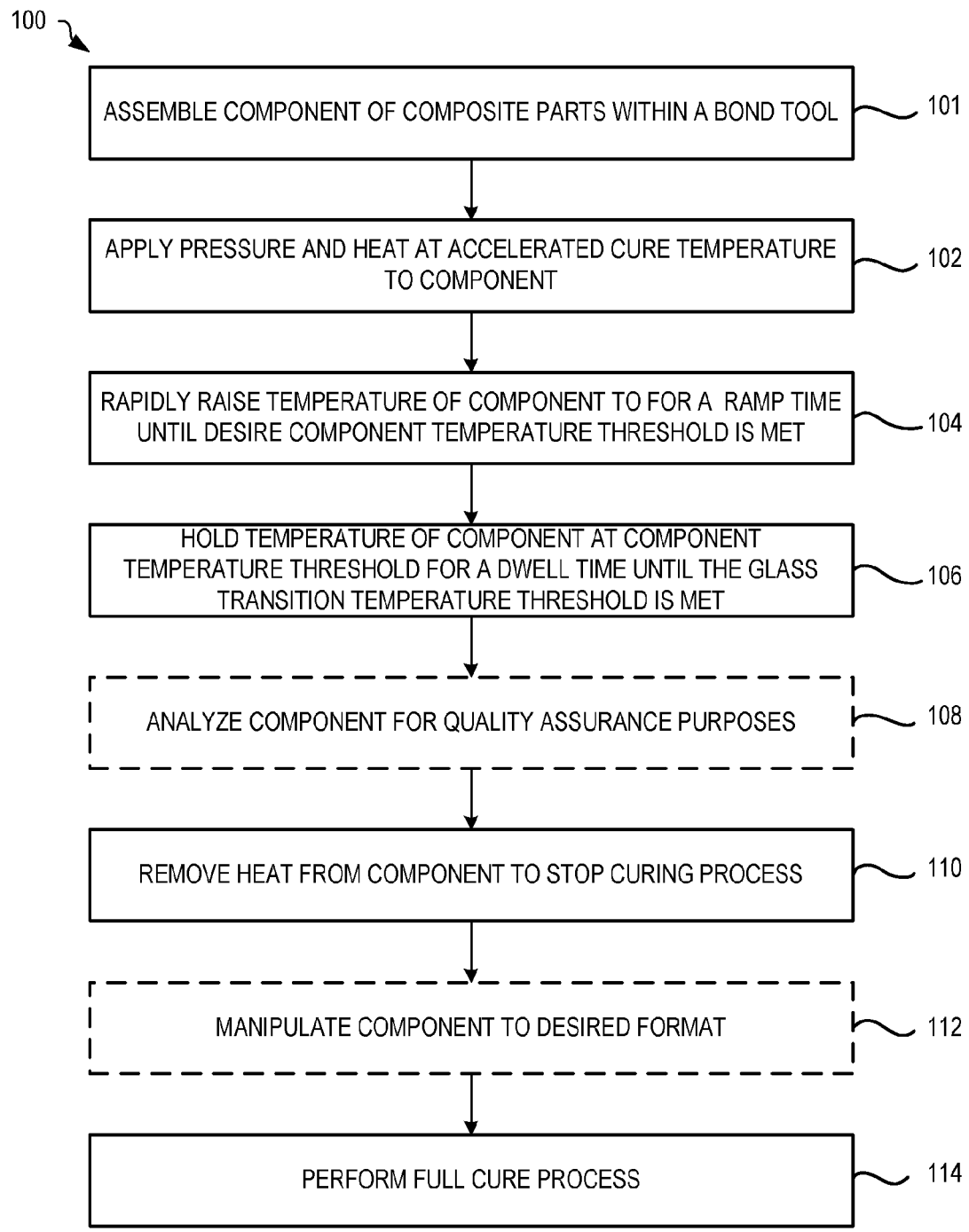
FIG. 1 is a flow chart depicting an embodiment of the fast cure process.

FIG. 1 depicts an exemplary fast cure process 100 for curing composite laminates.

In step 101, a component is assembled within a bond tool. For example, the component may comprise composite laminate pre-preg materials. In one embodiment, the bond tool is adapted to allow rapid heating of the component without inconsistent heating zones within the component. For example, the bond tool may be a bond tool as described in pending U.S. patent application Ser. No. 13/763,584 by Boone et. al., filed Feb. 8, 2013 and entitled "System and Method for Curing Composites", which is incorporated herein by reference.

In step 102, heat and pressure are applied to a composite laminate component. For example, the component is composed of a pre-preg composite laminate. The amount of heat applied to the pre-preg composite laminate is determined based on the specific material, fiber and resin of the composite laminate. For example, in one aspect, a temperature of 250 degrees Fahrenheit is applied. In another aspect, a temperature of 350 degrees Fahrenheit is applied. In yet another aspect, a temperature within the range of 250 to 650 degrees Fahrenheit is applied. In yet another aspect, pressure is applied to the component at a rate of 12 psi to 200 psi.

In step 104, the temperature of the component is rapidly raised for a predetermined ramp time until the temperature reaches a predefined component temperature threshold. For example, the predefined component temperature threshold may be a desired temperature of the component required to raise the glass transition temperature ($T_g$) of the pre-preg composite laminate. The glass transition temperature ($T_g$) is defined as a thermal transition that occurs in solid polymeric materials, which marks the onset, with increased temperature, of coordinated multi-atom movement, or in simpler terms, at what temperature the material becomes soft. The Tg temperature varies according fiber and resin content of the ply material. In one embodiment, the temperature of the component is raised at a rate of 15-20 degrees Fahrenheit/minute. In one embodiment the temperature of the component is raised at a rate of greater than 20 degrees Fahrenheit/minute. In one embodiment, the ramp time is approximately 20 to 30 minutes.

In step 106, the temperature of the component is held at component temperature threshold for a predetermined dwell time. The dwell time is defined by the time required to hold the temperature of the component at the component temperature threshold in order to raise the glass transition temperature of the component to a desired level. Accordingly, the dwell time may be directly proportional to the particular temperature of the component temperature threshold. In one embodiment, the dwell time in step 106 is the time required to reach 80-90 percent of the total cure for the pre-preg materials and yet provide stability need to support additional cures. For example, by raising the Tg of the component, the component may be subjected to a secondary or final cure, as discussed below, while still having stability in the physical properties of the component.

At this point in the process, the partially cured component is dimensionally stable, even at elevated temperatures. This dimensional stability of the fast cured composite structure allows trimming, bonding, and surface preparation. Further, the component may be secondarily heated with minimal distortion, as will be discussed below.

In one aspect, steps 104 and 106 are achieved using a dynamic mechanical analyzer. The dynamic mechanical analyzer is used to monitor the glass transition temperature of the component to accurately determine the thermal properties of the component during each respective step.

Step 108 is optional. In step 108, quality assurance procedures are performed on the component. For example, quality assurance procedures include testing the dimensions, weight, shape, etc., of the component. Those skilled in the art will appreciate that other inspections may be completed in step 108.

In step 110, the component is removed from heat. This step essentially stops the curing process. While curing is not completely stopped, the remaining curing time is drastically reduced. For example, typical pre-preg materials do not cure at room temperature for 20 or more days.

Step 112 is optional. In step 112, the component is manipulated to its desired format. For example, the component may be trimmed, cut or implemented within a larger structure (i.e. a preassembly component may be implemented within a composite structure). In one embodiment, additional composite laminate components are combined together.

In step 114, the component is completely cured. In one embodiment, both the component and any further manipulations made to the component are subjected to a final cure process. This final cure process completely cures the component and any manipulations to at least an equivalent strength.

The fast cure process described in FIG. 1 above allows for ease of constructing complex composite structures. Rigidity is imparted to a fast cured composite structure that allows for quality assurance as well as manipulation of the structure.

The fast cure process may be used with an apparatus for curing composites that requires less bulk and thus may be operated in various locales of a manufacturing facility. This reduces the size and number of facilities, the number of handling steps of the composite structure, and also reduces process times as well as cycle times.

The fast cure process does not replace a required full cure process at the very end of the manufacturing process in order to impart full strength to the complete composite structure.

Manufacturing of a Composite Structure Using a Fast Cure Process

The below description describes an exemplary method of manufacturing a composite structure using the fast cure process. This information described below coincides with pending U.S. patent application Ser. No. 13/763,427 to Boone et. al, entitled "Assembly Using Skeleton Structure," filed Feb. 8, 2013 and incorporated herein by reference.

A skeleton is a pre-assemblage of structural components. A skeleton structure is a pre-assembly of components such as stringers, frames, ribs, spars and other support structures that are bonded to a skin to form a composite structure. This disclosure is for a method of manufacturing a skeleton structure and then positioning the skeleton structure onto an uncured skin in order to form a composite structure. The various parts of the skeleton structure are fabricated and cured to form the skeleton structure as a single unit. Then, that single unit may be positioned upon the skin and bonded in order to create the composite structure. One advantage of this method is that the various components that form the skeleton structure are able to be positioned before the skeleton is cured to the skin. This allows for global positioning of the entire skeleton structure on the composite structure skin and does not require additional tooling that is needed for accurate positioning of the individual components of the skeleton structure piecewise onto the composite structure skin. The method also allows for assemblies with a higher degree of complexity and eliminates the use of caul sheets and reduces problems related to the tooling necessary for positioning the individual components of the skeleton structure piecewise onto the skin. The manufacturing of the composite structure is thus more consistent and with fewer errors with regard to the orientation of individual components of the skeleton structure.

In one embodiment, a method of manufacturing is disclosed that results in a composite structure having tighter tolerances for inner mold line (IML) and outer mold line (OML) specifications. This is due in part to the use of a single bond tool for the manufacturing of the skeleton structure, allowing for the exact placement of the individual pieces of the skeleton structure with respect to one another. The bond tool holds the component pieces of the skeleton structure in place while the entire structure is fast cured. This fast curing bonds the component pieces to one another and imparts rigidity to the skeleton structure. Although not fully cured, the strength of the fast cured skeleton structure is sufficient to allow for measuring the tolerances of the skeleton structure before it is bonded to the composite structure skin and thus introducing an additional quality control step into the manufacturing process of the composite structure.

The fast cured skeleton components may also be inspected before they are bonded to the skin. Also, the bond tool complexity is decreased because the components are first fast cured on a simpler bond tool and then a simple bond tool can be used for bonding the fast cured component single unit to a composite structure or other skin. An additional aspect to this method of manufacturing is that additional structural details can be bonded to the skin after the fast cured component has been configured with the skin so that the placement of the additional structural details can be more precisely configured with respect to the skeleton.

Figure 2:
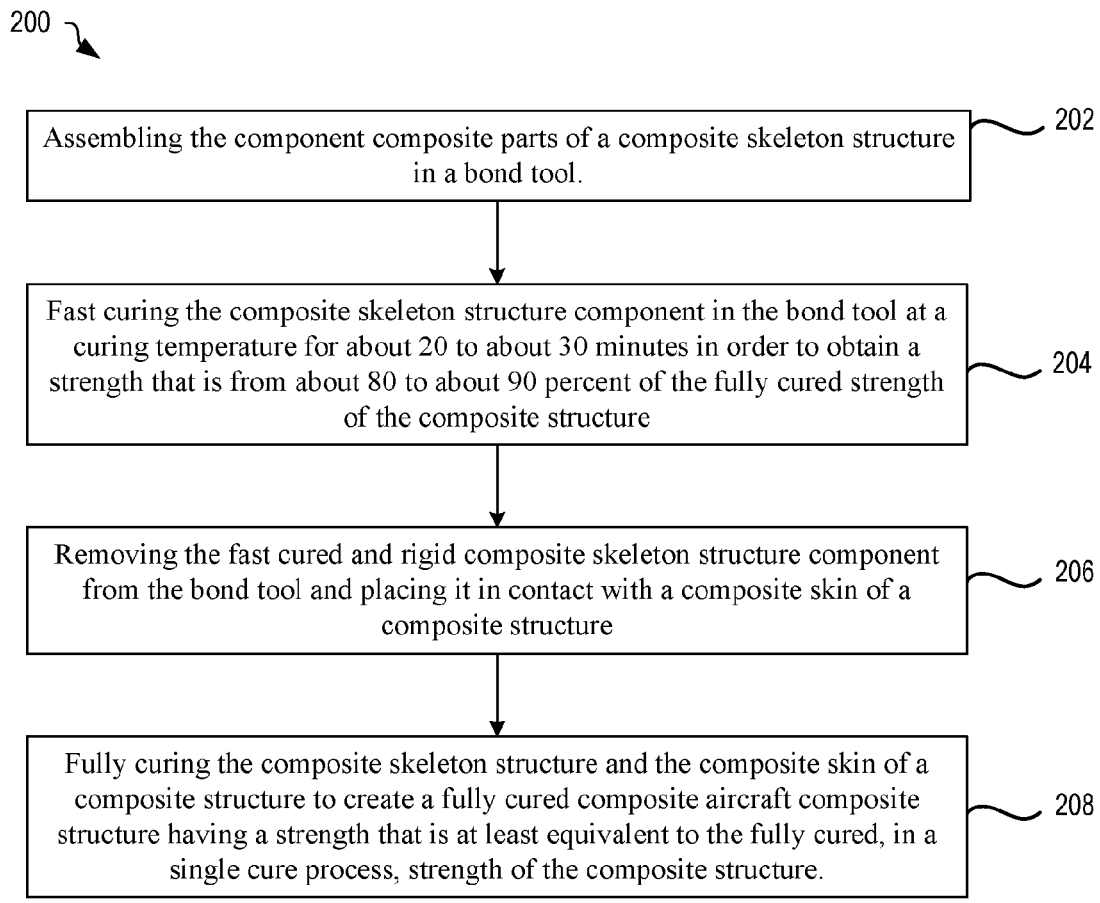
FIG. 2 depicts an exemplary fast cure process for manufacturing a composite aircraft composite structure, in one embodiment.

FIG. 2 depicts a fast cure process 200 for manufacturing a composite aircraft composite structure. In step 202, the component composite parts of a composite skeleton structure are assembled in a bond tool. In step 204, the composite skeleton structure components are fast cured in the bond tool at a curing temperature for about 20 to about 30 minutes in order to obtain a strength that is from about 80 to about 90 percent of the fully cured strength of the composite structure. In step 206, the fast cured and rigid composite skeleton structure components are removed from the bond tool and placed in contact with a composite skin of a composite structure to form a composite structure skeleton having a composite skin. In step 208, the composite skeleton structure and the composite skin of a composite structure are fully cured to create a fully cured composite aircraft composite structure having at least an equivalent strength of the fully cured strength of the composite structure.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

The invention claimed is:

1. A method for fast curing a component made from composite laminate, comprising:
    assembling the component within a bond tool, wherein the bond tool is adapted to prevent inconsistent heating of the component;
    rapidly raising the temperature of the component at a rate of 15-20 degrees Fahrenheit per minute by applying heat at an accelerated temperature for a ramp time until the temperature of the component reaches a component temperature threshold;
    holding the temperature of the component at the component temperature threshold for a dwell time until the glass transition temperature is raised to a desired glass transition temperature threshold; and
    removing heat from the component to slow the curing process.

2. The method of claim 1, wherein the ramp time is equivalent to 20 to 30 minutes.

3. The method of claim 1, wherein the glass transition temperature comprises as a temperature where thermal transition that occurs in a solid polymeric materials, which marks the onset of coordinated multi-atom movement or softening of that material.

4. The method of claim 1, further comprising the step of analyzing the component for quality assurance.

5. The method of claim 1, further comprising the step of manipulating the component to a desired format after the step of removing heat.

6. The method of claim 5 further comprising completing the cure of the component such that a strength of the component is at least equivalent to a fully cured component cured in a single stage.

7. The method of claim 1 wherein the dwell time is determined based upon a defined temperature.

8. A method for fast curing a component made from composite laminate, comprising:
    assembling the component within a bond tool;
    rapidly raising the temperature of the component at a rate of at least about 15 degrees Fahrenheit per minute by applying heat at an accelerated temperature for a ramp time until the temperature of the component reaches a component temperature threshold;
    holding the temperature of the component at the component temperature threshold for a dwell time until the glass transition temperature is raised to a desired glass transition temperature threshold; and
    removing heat from the component to slow the curing process.

9. The method of claim 8, the step of rapidly raising the temperature of the component comprising a rate between 15 degrees and 20 degrees Fahrenheit per minute.

10. The method of claim 8, the step of rapidly raising the temperature of the component comprising a rate of greater than 20 degrees Fahrenheit per minute.

* * * * *